US006285132B1

(12) United States Patent
Conley, III et al.

(10) Patent No.: US 6,285,132 B1
(45) Date of Patent: Sep. 4, 2001

(54) EMERGENCY LIGHTING TEST SYSTEM AND METHOD

(75) Inventors: William H. Conley, III, Marana; David G. Light, Tucson, both of AZ (US)

(73) Assignee: IOTA Engineering Co., Tucson, AZ (US)

(*) Notice: Subject to any disclaimer, the term of this patent is extended or adjusted under 35 U.S.C. 154(b) by 0 days.

(21) Appl. No.: 09/556,103

(22) Filed: Apr. 21, 2000

(51) Int. Cl.[7] .................................................. H05B 37/00
(52) U.S. Cl. ............................................. 315/86; 315/129
(58) Field of Search ............................ 315/86, 129–133, 315/119, 120, 224, 225, 291, 307; 340/514, 516, 333; 307/64, 66; 362/20

(56) References Cited

U.S. PATENT DOCUMENTS

| | | | |
|---|---|---|---|
| 4,063,108 | * 12/1977 | Klett et al. ........................ | 307/64 |
| 4,945,280 | * 7/1990 | Beghelli .......................... | 315/129 |
| 5,154,504 | * 10/1992 | Helal et al. ....................... | 362/20 |
| 5,442,257 | * 8/1995 | Mitsumoto ........................ | 315/129 |
| 5,652,479 | * 7/1997 | LoCascio et al. .................. | 315/225 |
| 5,666,029 | 9/1997 | McDonald ......................... | 315/86 |
| 5,811,938 | * 9/1998 | Rodriguez ........................ | 315/86 |
| 6,072,283 | * 6/2000 | Hedrei et al. ..................... | 315/307 |

* cited by examiner

*Primary Examiner*—Don Wong
*Assistant Examiner*—Ephrem Alemu
(74) *Attorney, Agent, or Firm*—Antonio R. Durando

(57) ABSTRACT

An emergency lighting test system and method automatically schedules self tests and uses novel test methods to thoroughly test an emergency lighting system. An emergency lighting system comprises a fluorescent lamp, an inverter circuit and a backup power source (e.g. a battery). A microcontroller controls testing of the system and tracks time of day and date for scheduling tests of the lighting system. After a test is performed, the test reports are stored in memory. Two novel tests are used to evaluate the lighting system. A first test determines backup power source condition. The test samples the high frequency signal generated by the inverter circuit to determine an average peak voltage. The average peak voltage is indicative of backup power source voltage. If the average peak voltage falls below a predetermined lower limit, it indicates a backup power source failure. The lamp is turned off and a failure is flagged. A second test determines lamp and inverter condition. This test measures the frequency of the high frequency signal generated by the inverter circuit. The high frequency signal is filtered and divided down to a convenient frequency suitable for interfacing with the microcontroller. A frequency outside of a predetermined range indicates a failed lamp or failed inverter circuit. The lamp is turned off and a failure is flagged.

24 Claims, 3 Drawing Sheets

EMERGENCY LIGHTING TEST SYSTEM AND METHOD

BACKGROUND OF THE INVENTION

1. Field of the Invention

This invention is related in general to the field of emergency lighting and, in particular, to systems and methods for self testing emergency lighting systems.

2. Description of the Related Art

Emergency lighting is required by most safety codes in the United States. Emergency lights provide temporary lighting in the event of a power failure. During normal operation, power is provided from power mains to operate the lamp and to charge a backup power source (e.g. a battery). When power from the mains is interrupted, the backup power source provides power to the lamp for a limited time (typically 90 minutes).

It is desirable to test emergency lights periodically to ensure proper operation. A typical prior art self test is initiated by a person pressing a button or switch on the lighting unit. A simple voltage and/or current test is performed and a light or buzzer is activated if the test fails.

There are several problems with the prior art. One problem is that safety codes typically require a brief (e.g. 30 second) test every month and a longer (e.g. 90 minute) test each year. The prior art requires a person to initiate, monitor and manually record each of these tests. Consequently, testing is easily neglected, records of the tests are easily lost and costs for personnel to do the testing and track the testing are incurred.

Other problems are associated with self testing of lighting systems which use fluorescent lamps. Fluorescent lamps differ from non-fluorescent lamps in that a high frequency signal is needed to power them. During normal operation AC line power is converted to a higher frequency to efficiently power the fluorescent lamp. When the main power source is interrupted, DC power from the backup power source is converted into a high frequency signal to power the fluorescent lamp.

A problem with the prior art is that only the backup power source and the fluorescent lamp are tested. Other parts and circuits may not be directly tested. This is due to the simple methods used in the prior art to perform the self test. For example, the prior art typically tests the backup power source by simply disconnecting the main power from the system and measuring the voltage across the backup power source. If the voltage drops below a predetermined limit a failure light or LED is activated. This self test method does not detect other failures in the system.

Similarly, the prior art tests fluorescent lamps by simply sensing the current to the lamp. This is done by measuring the voltage across a resistive element and computing current using Ohm s law. There is a correlation between current into a fluorescent lamp and proper lamp operation. If the current is outside of predetermined limits the lamp is determined to be failed and an LED is activated.

Some of the problems with this technique are that a resistive element introduces power loss, interferes with normal operation of the circuit, may require a high tolerance resistive element, may require a high resolution analog to digital (A/D) converter, is unlikely to detect problems in other parts of the system and can fail to detect a failed lamp under some conditions. For example, in the prior art, it is possible that the inverter circuit may consume enough current to "fool" a controller into determining that the lamp and inverter are operating normally when, in fact, either or both are not working properly.

Examples of prior art testing techniques and deficiencies are found in U.S. Pat. No. 5,666,029, issued Sep. 9, 1997, to McDonnell, which is incorporated herein by reference.

Clearly there exists the need for an improved emergency lighting test system and method which automatically perform lighting system tests, automatically keep records of testing, do not require high tolerance components, do not require high resolution A/D converters, are a simple design and provide thorough self testing.

BRIEF SUMMARY OF THE INVENTION

The invention discloses an emergency lighting test system and method for automatic scheduling and testing of emergency lighting systems. A typical emergency lighting system comprises a lamp and a backup power source (e.g., a battery). The invention provides a microcontroller (i.e., the controller) which controls testing of the lighting system and automatically schedules tests of the lighting system. Automatic self testing reduces costs, keeps the lighting system in compliance with safety codes and automatically keeps records of the tests. The invention also uses two novel diagnostic test methods to evaluate the condition of fluorescent light type emergency lighting systems.

Fluorescent light type emergency lighting systems are unique in that an inverter circuit is required to convert DC power from the backup power source into a high frequency power signal. The two novel diagnostic tests use this high frequency signal to thoroughly test the system.

The first novel test method evaluates the condition of the backup power source and other parts of the system circuitry. This test functions as follows. The main power source is disconnected so that the backup power source provides power for the lamp. The high frequency signal generated by the inverter circuit is over sampled. Over sampling requires sampling a signal at a sufficiently high rate to successfully determine or extract desired data. The preferred embodiment uses an 8 bit A/D converter to sample the high frequency signal at four times the nominal frequency of the high frequency signal. The controller analyzes the samples taken by the A/D converter and determines a peak voltage for each of multiple predetermined time periods. The resulting multiple peak voltages are averaged to determine an average peak voltage.

The average peak voltage from the inverter is representative of the voltage of the backup power source. If the average peak voltage falls below a predetermined lower limit, it indicates a backup power source failure or a circuit problem. The lamp is turned off, a failure is flagged and a battery fail LED is activated.

The second test evaluates the condition of the lamp and the inverter. This test functions as follows. The main power is disconnected and the backup power source is providing power for the lamp. The high frequency signal is conditioned for interfacing with the microcontroller. In the preferred embodiment, a filter shapes the signal into a square wave and reduces the voltage such that the filtered signal can be interfaced with a digital circuit. The filtered signal is input to a counter which reduces the raw frequency by 1024. The filtered and reduced signal is input to the interrupt of the microcontroller which counts the interrupts and determines the frequency.

A frequency outside of a predetermined range indicates a failed lamp or failing inverter circuit. A frequency of zero indicates a probable failed inverter circuit. By using this testing technique, it is possible to better determine if the inverter or lamp has failed. The lamp is turned off, a failure is flagged and a frequency fail LED is activated. A lamp failure is predicted by the controller as the frequency trends toward the limits of the predetermined range. A predictive warning status is flagged or stored into memory.

Therefore, an object of the invention is to provide an improved system and method for testing emergency lighting systems.

A feature of the invention is a controller having current time of day and date data and a testing schedule.

Another feature of the invention is a storage means for recording test report data.

Another feature of the invention is an A/D converter sampling the high frequency output of an inverter circuit.

Another feature of the invention is a controller capable of computing a maximum voltage using samples from the A/D converter.

Another feature of the invention is a controller determining the condition of a fluorescent lamp as a function of the frequency of the inverter output.

Advantages of the invention include reduced operating cost, reliable scheduling of tests and reliable record keeping of test results.

Another advantage is automatic compliance with safety codes for periodic testing.

Another advantage is more thorough testing of fluorescent type emergency lighting systems.

Yet another advantage is that high tolerance sensing elements, high resolution A/D converters, or multiple A/D converters are not needed.

Still yet another advantage is non-intrusive testing without the need for sensing resisters or coils.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only one of the various ways in which the invention may be practiced.

DESCRIPTION OF THE PREFERRED
EMBODIMENT OF THE INVENTION

Figure 1:
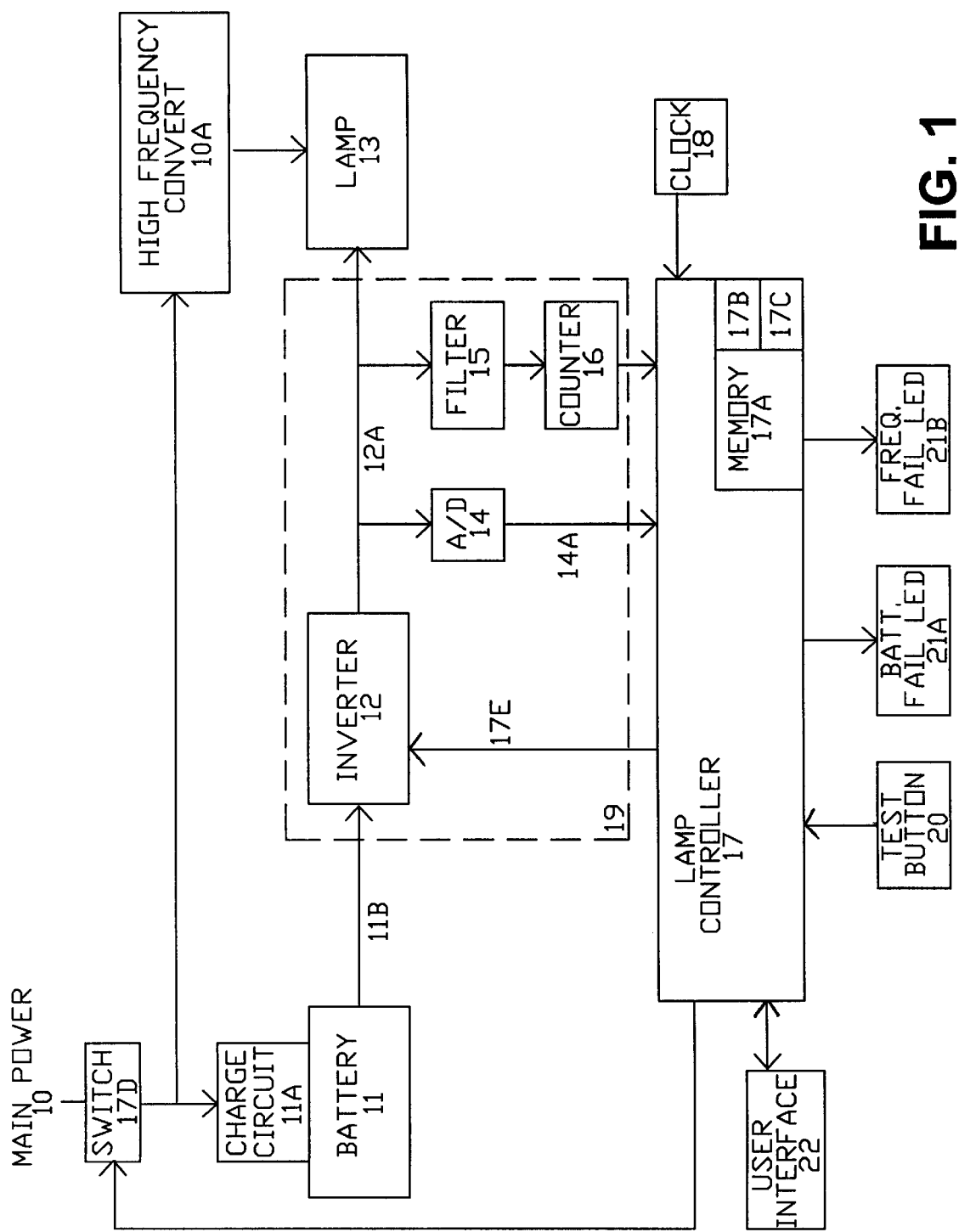
FIG. 1 is an block diagram of the invention as part of an emergency lighting system.

FIG. 1 illustrates the preferred embodiment of the invention for testing a fluorescent emergency lighting system. Shown in FIG. 1 is power main 10 and its high frequency converter 10A. Also shown are emergency lighting components including battery 11, battery charge circuitry 11A, inverter 12 and fluorescent lamp 13. Test components include controller 17, memory 17A, schedule memory 17B, report memory 17C, switch 17D, clock 18, A/D converter 14, filter 15 and counter 16. Other components shown are self test button 20, battery fail LED 21A, frequency fail LED 21B and user interface 22.

During normal operation power main 10 provides power to fluorescent lamp 13 via high frequency converter 10A. A high frequency signal is much more efficient in powering a fluorescent lamp. High frequency converter 10A is well known in the art. Power main 10 also charges battery 11 via charging circuitry 11A.

In the event of an interruption of power from power main 10, battery 11 provides power to lamp 13 via inverter 12. The preferred embodiment uses a battery; however, those skilled in the art recognize that the invention will work with other types of backup power sources. Battery 11 is of a standard type used in the industry.

Battery 11 generates DC power 11B which is converted to high frequency power for fluorescent lamp 13. Inverter 12 converts DC power 11B into high frequency signal 12A in a conventional manner. Nominal frequency for high frequency signal 12A is 20 kHz. Fluorescent lamp 13 is of conventional design.

Controller 17 coordinates much of the automatic testing and interfaces with many other components. The preferred embodiment uses a PIC16C76B microcontroller manufactured by Microchip Technology Inc. which is located in Chandler, Ariz. This microcontroller has on-board RAM and ROM memories and an on-board A/D converter. Memories 17A, 17B and 17C are implemented in these on-board memories. A/D converter 14 is on-board the PIC16C76B but is shown separately in FIG. 1 for illustrative purposes. However, those skilled in the art understand that many other equivalent microcontrollers, microprocessors or circuits may also be used to perform substantially the same functions as controller 17.

Controller 17 receives a clock signal from clock 18. Clock 18 provides time of day and date information. The preferred embodiment uses a clock 18 with battery backup so that if controller 17 is reset the date and time information is not lost. Controller 17 also inputs scheduling data from schedule memory 17B. Controller 17 uses both the data from clock 18 and data from schedule memory 17B to determine when to run a test.

Scheduling data is either preprogrammed into schedule memory 17B or input by a user via user interface 22.

When controller 17 determines that a test is to run, controller 17 causes power main 10 to be disconnected from the lighting system via a signal sent to switch 17D. Switch 17D is a conventional switch commonly used in the art. Controller 17 inputs status signals from coupling circuitry 18. Examples of status signals include voltage samples 14A of A/D converter 14 and frequency signal 16A output of counter 16. Not shown in this embodiment, status signals may also include signals from sensing resisters and coils, voltages, status bytes and the like which communicate status information about the health of a system.

Controller 17 analyzes the status signals to determine if a failure condition exists or if a failure is predicted. A test report is generated and stored into report memory 17C for later retrieval by a user. The report data stored in memory 17C includes date and time of the test, test result and length of test.

User interface 22 is used to output data to a user and input data from a user. A user may retrieve test reports, schedule tests, changed date and time information, and perform other functions. The preferred embodiment uses a touch screen for the user interface.

Self test button 20 is a standard button or switch which permits a user to manually initiate a self test. Test button 20 is located on the light fixture.

LEDs (light emitting diodes) 21 are activated to notify a user of a failure. Battery fail LED 21A indicates a battery failure and frequency fail LED 21B indicates either a lamp 13 or inverter 12 failure. LEDs 21 are of conventional design.

Memories 17A, 17B, 17C are all located on-board microcontroller 17. Memory 17A is general purpose memory used for storing the microcontroller program and temporary variables. Memory 17A includes both ROM and RAM. Schedule memory 17B is preferably EEPROM which can store both preprogrammed and user entered schedules. Report memory 17C is preferably EEPROM and provides storage for test reports. EEPROM safely stores data even in the event of a power loss.

One of the two novel tests methods of this invention determines the condition of battery 11 via high frequency signal 12A. This test uses A/D converter 14 to over sample high frequency signal 12A. In the preferred embodiment, A/D converter 14 samples high frequency signal 12A at over four times the nominal frequency of signal 12A to achieve satisfactory results. This sampling is illustrated in FIG. 2.

Figure 2:
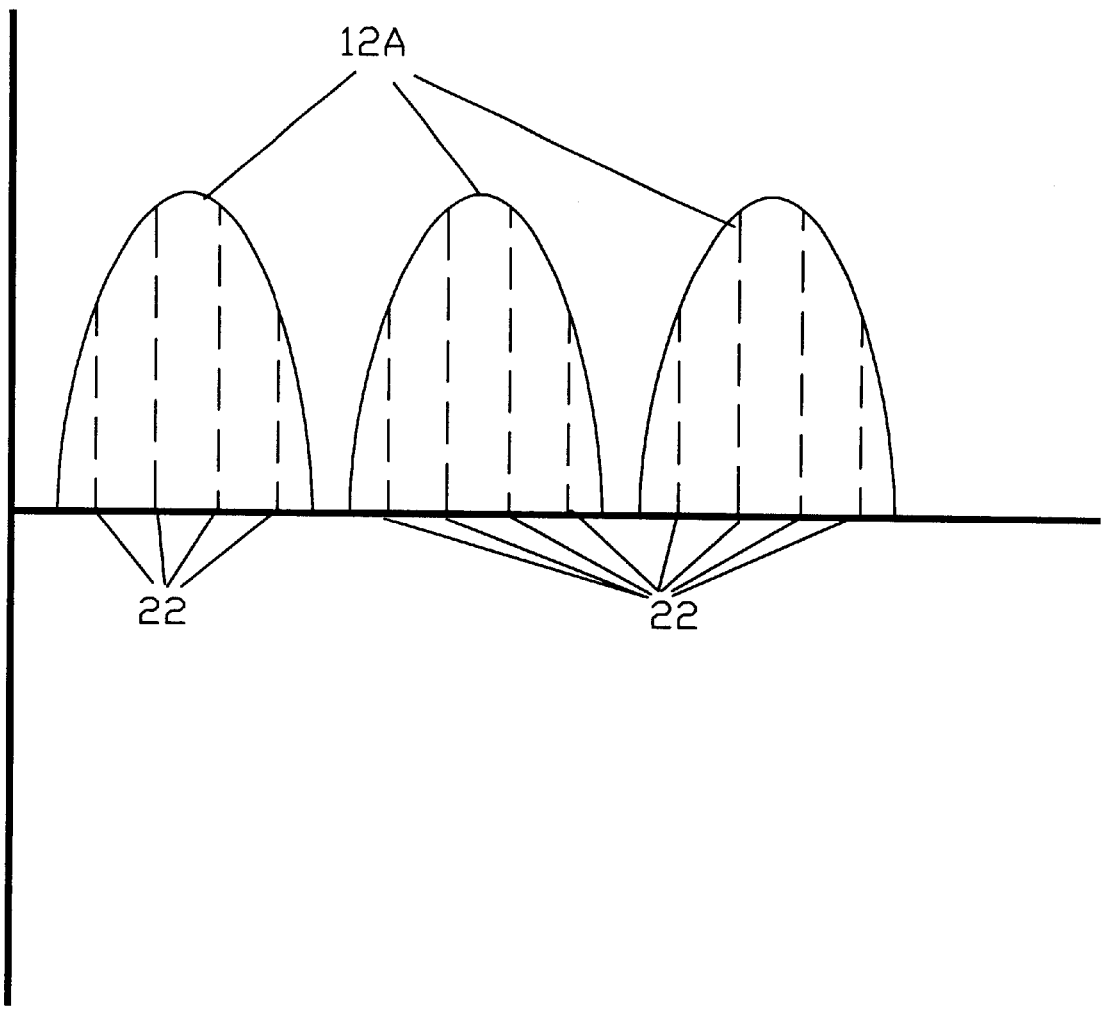
FIG. 2 illustrates sampling of the inverter circuit output to determine maximum peak voltage.
Figure 3:
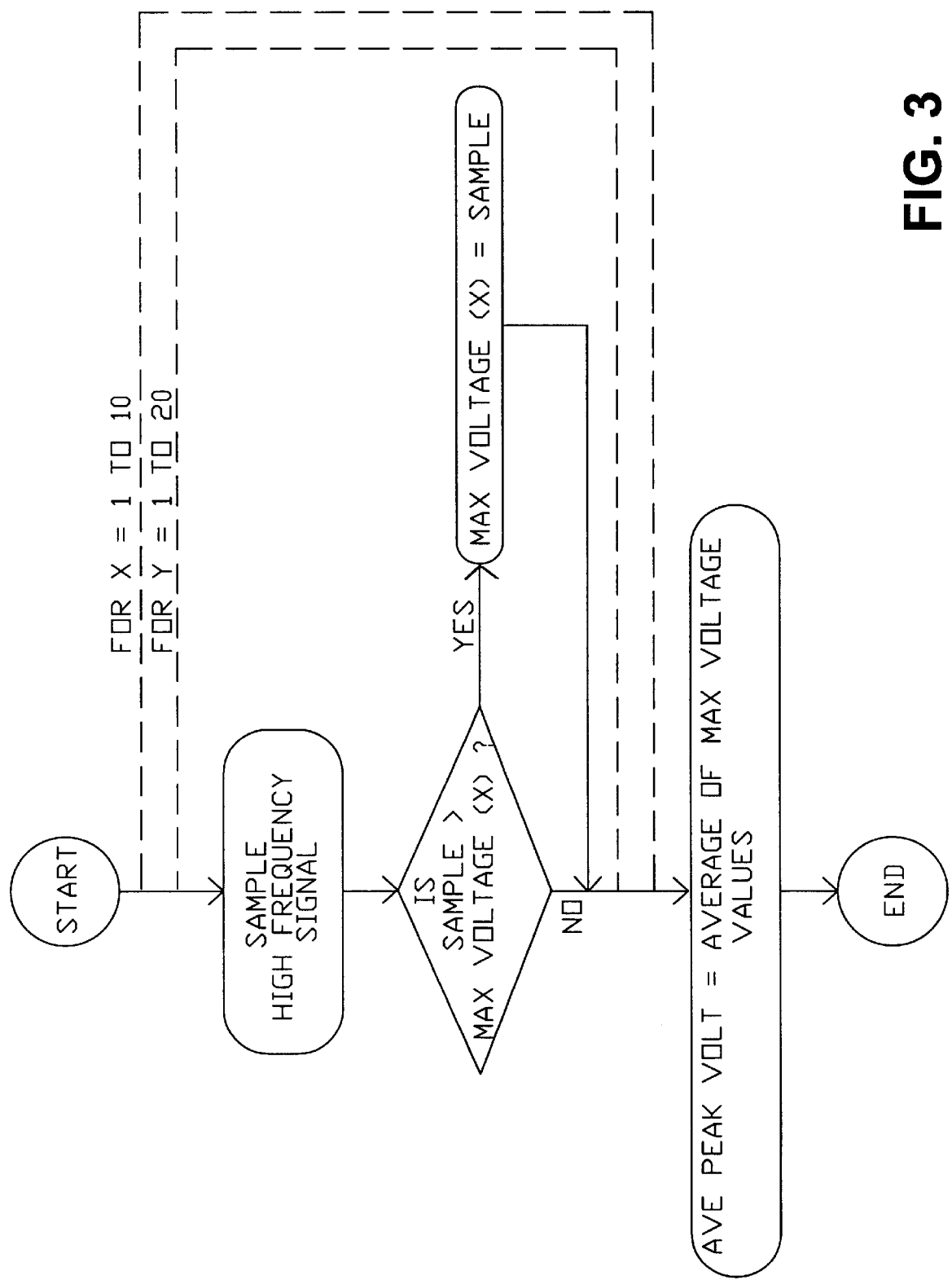
FIG. 3 is a flowchart for computing average peak voltage.

FIG. 2 shows high frequency signal 12A and samples 22 which are indicated with dash lines. It is readily apparent that when sampling is done at a sufficiently high frequency and for a sufficient period of time, the average peak voltage can be easily obtained. Controller 17 inputs voltage samples 14A from A/D converter 14. Controller 17 selects the maximum voltage from several time periods. These maximum voltages are averaged to produce an average peak voltage which is representative of the voltage across battery 11. This process is illustrated in the flowchart of FIG. 3. An average peak voltage value of less than 87.5% of the initial value indicates a failure in either the battery or possibly other elements of the system. Inverter 12 is turned off via disable signal 17E, a failure is flagged and the battery fail LED 21A is activated.

FIG. 3 is a flow diagram illustrating the sampling algorithm. In the diagram, 20 samples are taken and the maximum voltage is saved. Then another 20 samples are taken and another maximum voltage is saved. This is repeated until 10 maximum voltages are saved. The 10 maximum voltages are then averaged to produce the average peak voltage. Those skilled in the art understand that many different sampling algorithms may also be used for this purpose.

A/D converter 14 is a conventional 8 bit A/D converter known in the art.

The second novel test method of this invention involves determining the condition of fluorescent lamp 13 and inverter circuit 12 using high frequency signal 12A. The test is based on the fact that high frequency signal 12A varies in frequency as a function of the load created by lamp 13. As the load increases, the frequency decreases. Conversely, as the load decreases the frequency increases. Using this principle, the invention monitors the frequency of signal 12A. The nominal frequency for signal 12A is 20 kHz.

This test is implemented using filter 15, counter 16 and controller 17. Filter 15 conditions high frequency signal 12A for use by counter 16. Filter 15 converts signal 12A into a square wave and also reduces the voltage as needed to interface with counter 16. Filter 15 is of conventional design and well know to those skilled in the art. Counter 16 is a digital counter. Counter 16 inputs the conditioned signal from filter 15. Counter 15 is programmed to reduce the frequency of the signal by 1024. This makes the signal easy to process by controller 17. The output of counter 16 is input to an interrupt of controller 17. Controller 17 counts the interrupts and determines the frequency by counting the number of interrupts in a given period of time. If high frequency signal 12A is determined to be outside of the predetermined limits which are stored in memory 17A, a failure is logged and controller 17 stores an appropriate test report into report memory 17C indicating the failure. If the frequency decreases below 17 kHz or rises above 25 kHz, the invention flags or logs a lamp failure. If the frequency goes to zero, then a failure of inverter 12 is flagged. In either case, frequency fail LED 21B is activated. If high frequency signal 12A is determined to be within the predetermined limits, controller 17 stores an appropriate test report into memory 17C indicating no failure.

Various changes in the details, steps and components that have been described may be made by those skilled in the art within the principles and scope of the invention herein illustrated and defined in the appended claims. For example, various kinds of components, memories, circuits, algorithms, controllers and backup power sources could be used with equivalent results. similarly, various physical embodiments are also envisioned. Thus, while the present invention has been shown and described herein in what is believed to be the most practical and preferred embodiment, it is recognized that departures can be made therefrom within the scope of the invention, which is not to be limited to the details disclosed herein but is to be accorded the full scope of the claims so as to embrace any and all equivalent processes and products.

We claim:

1. An emergency lighting power system for providing power to a lamp, said system comprising:
    (a) a backup power source suitable for powering said lamp;
    (b) an inverter circuit capable of converting DC power into a high frequency signal, said inverter circuit having,
        (1) an input in communication with said backup power source, and,
        (2) an output in communication with said lamp; and,
    (c) a controller in communication with the output of said inverter circuit, said controller performing at least one diagnostic test on said high frequency signal.

2. The emergency lighting power system according to claim 1 wherein said controller analyzes said high frequency signal to detect a low voltage condition of said backup power source.

3. The emergency lighting power system according to claim 2 wherein said controller determines an average peak voltage of said high frequency signal and detects a low voltage condition if said average peak voltage is below a predetermined limit.

4. The emergency lighting power system according to claim 3 wherein said controller computes said average peak voltage using multiple samples of said high frequency signal.

5. The emergency lighting power system according to claim 1 wherein said controller analyzes said high frequency signal to detect a failure of said lamp.

6. The emergency lighting power system according to claim 5 wherein said controller flags a failure when the frequency of said high frequency signal is outside of a predetermined range.

7. The emergency lighting power system according to claim 5 further comprising a counter suitable for reducing the frequency of a signal, said counter having an input in communication with said output of said inverter circuit and having an output in communication with said controller.

8. The emergency lighting power system according to claim 5 wherein said controller detects a predicted failure of said lamp when the frequency of said high frequency signal trends to a limit of said predetermined range.

9. A failure detection apparatus for detecting failures in an emergency lighting system, said emergency lighting system having an inverter generating a high frequency signal, said inverter connected between a backup power source and a lamp, said detection apparatus comprising:

(a) controller means, in communication with the high frequency signal output of said inverter, said controller means for performing at least one diagnostic test as a function of said high frequency signal.

10. The failure detection apparatus according to claim 9 wherein at least one of said diagnostic tests includes testing the condition of said backup power source.

11. The failure detection apparatus according to claim 10 wherein said controller means computes an average peak voltage as a function said high frequency signal and flags a failure if said average peak voltage is less than a predetermined limit.

12. The failure detection apparatus according to claim 11 wherein said controller means computes said average peak voltage as a function of multiple samples of the voltage of said high frequency signal.

13. The failure detection apparatus according to claim 9 wherein said at least one diagnostic test includes testing the condition of said lamp.

14. The failure detection apparatus according to claim 13 wherein said controller means determines the frequency of said high frequency signal and flags a failure if the frequency is outside of a predetermined range.

15. The failure detection apparatus according to claim 9 further comprising data storage means, in communication with said controller means, for storing data and wherein said controller means stores test report data, said report data indicative of the result of said at lest one diagnostic test.

16. The failure detection apparatus according to claim 9 further comprising clock means, in communication with said controller means, for providing time and date data, and wherein said controller means initiates scheduled tests as a function of said time and date data.

17. A method of detecting backup power source failures in an emergency lighting system having a backup power source, a fluorescent lamp, and an inverter connected between said backup power source and said lamp, said method comprising the steps of:

(a) determining a maximum voltage of a high frequency signal output of said inverter;

(b) comparing said maximum voltage with a predetermined limit; and, (c) performing appropriate actions if said maximum voltage is below said predetermined limit.

18. The method of detecting backup power source failures according to claim 17 wherein the step of determining a maximum voltage includes the step of sampling said high frequency signal multiple times.

19. The method of detecting backup power source failures according to claim 17 wherein performing appropriate actions includes turning off said lamp and flagging a failure.

20. A method of detecting a fluorescent lamp failure in a lighting system having a backup power source, a fluorescent lamp, and an inverter connected between said backup power source and said lamp, said inverter generating a high frequency signal, said method comprising the steps of:

(a) measuring the frequency of said high frequency signal;

(b) comparing said frequency with a predetermined frequency range; and, (c) performing appropriate actions if said frequency is outside of said predetermined frequency range.

21. The method of detecting a fluorescent lamp failure according to claim 20 wherein the step of measuring the frequency includes the step of conditioning said high frequency signal.

22. The method of detecting a fluorescent lamp failure according to claim 21 wherein performing appropriate actions includes turning off said lamp and logging a failure.

23. An automated test system for an emergency lighting system having a backup power source, a lamp and coupling circuitry connected between the backup power source and the lamp, said coupling circuitry generating at least one status signal related to the condition of the system, said test system comprising:

(a) a clock generating time and date data;

(b) a schedule memory suitable for storing schedule data representative of a testing schedule; and, (c) a controller, in communication with said coupling circuitry, said clock and said schedule memory, said controller initiating at least one diagnostic test as a function of said time and date data and said schedule data stored in said schedule memory.

24. The automated test system according to claim 23 further comprising a report memory in communication with said controller and wherein said controller stores test report data into said report memory.

* * * * *